H. A. HUMPHREY.
UTILIZING AN EXPANSIVE FORCE.
APPLICATION FILED JUNE 13, 1908. RENEWED FEB. 17, 1917.
1,243,296.
Patented Oct. 16, 1917.
4 SHEETS—SHEET 1.
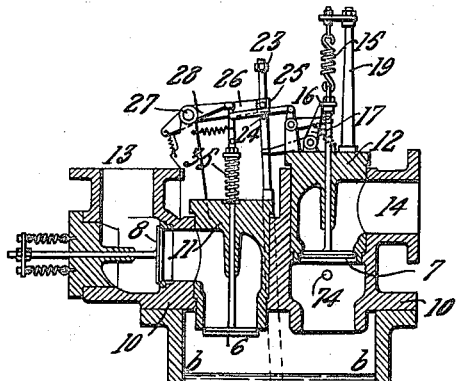
Fig. 1.
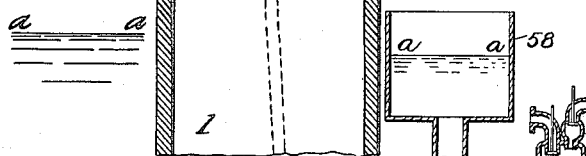
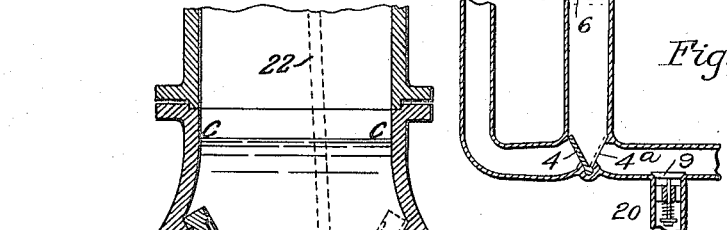
Fig. 5.
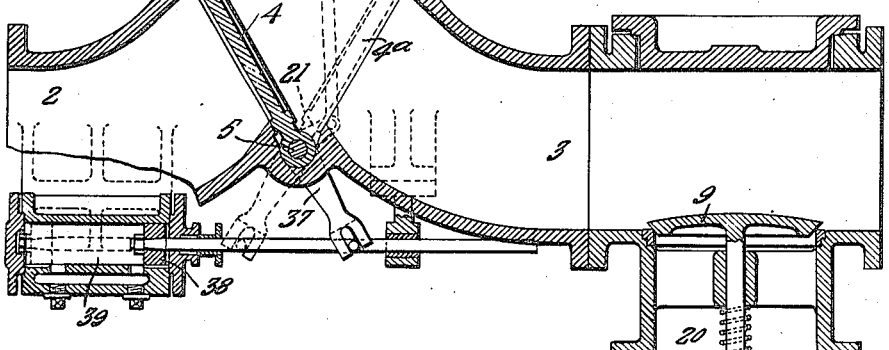
Witnesses:
Inventor
Herbert A. Humphrey
By James L. Norris
Atty.

H. A. HUMPHREY.
UTILIZING AN EXPANSIVE FORCE.
APPLICATION FILED JUNE 13, 1908. RENEWED FEB. 17, 1917.
1,243,296.
Patented Oct. 16, 1917.
4 SHEETS—SHEET 2.
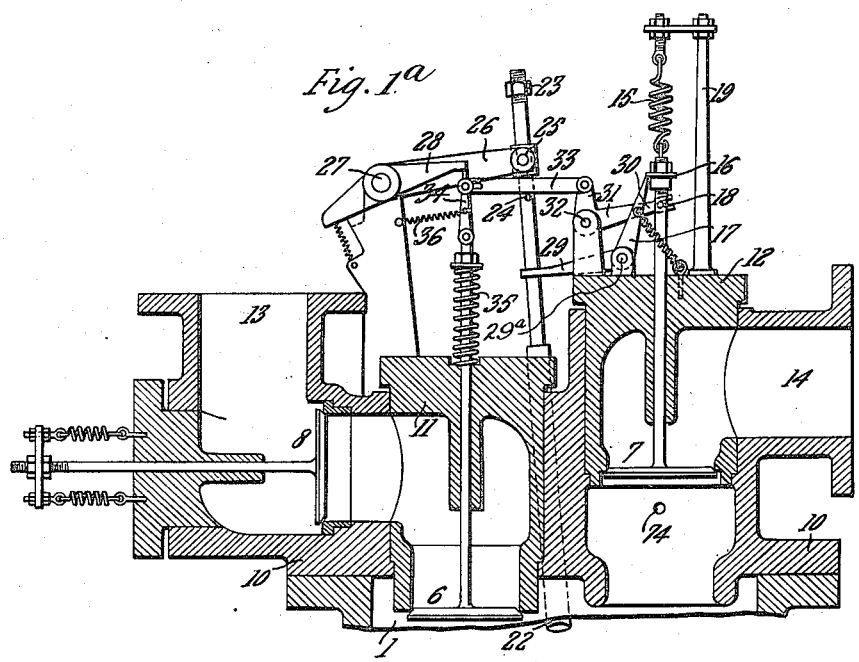
Fig. 1ᵃ
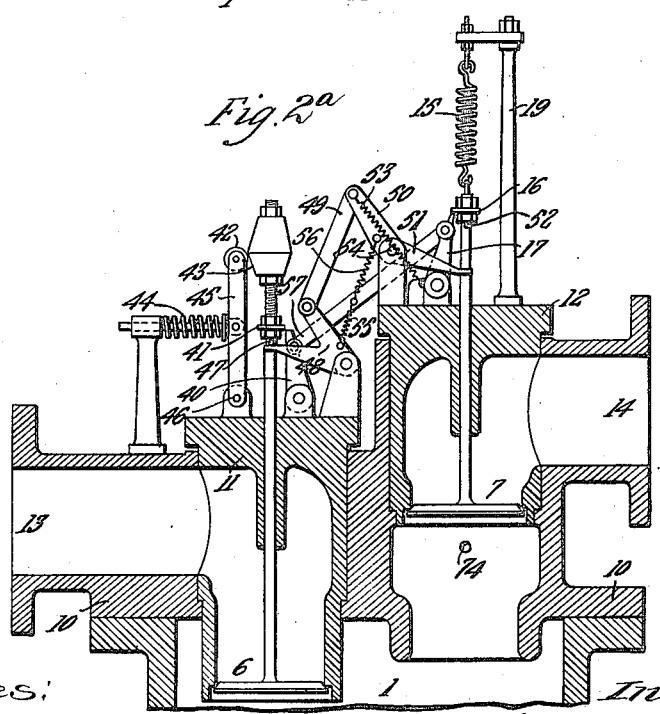
Fig. 2ᵃ
Witnesses:
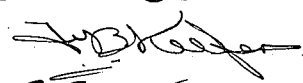
Inventor
Herbert A. Humphrey
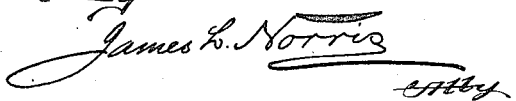

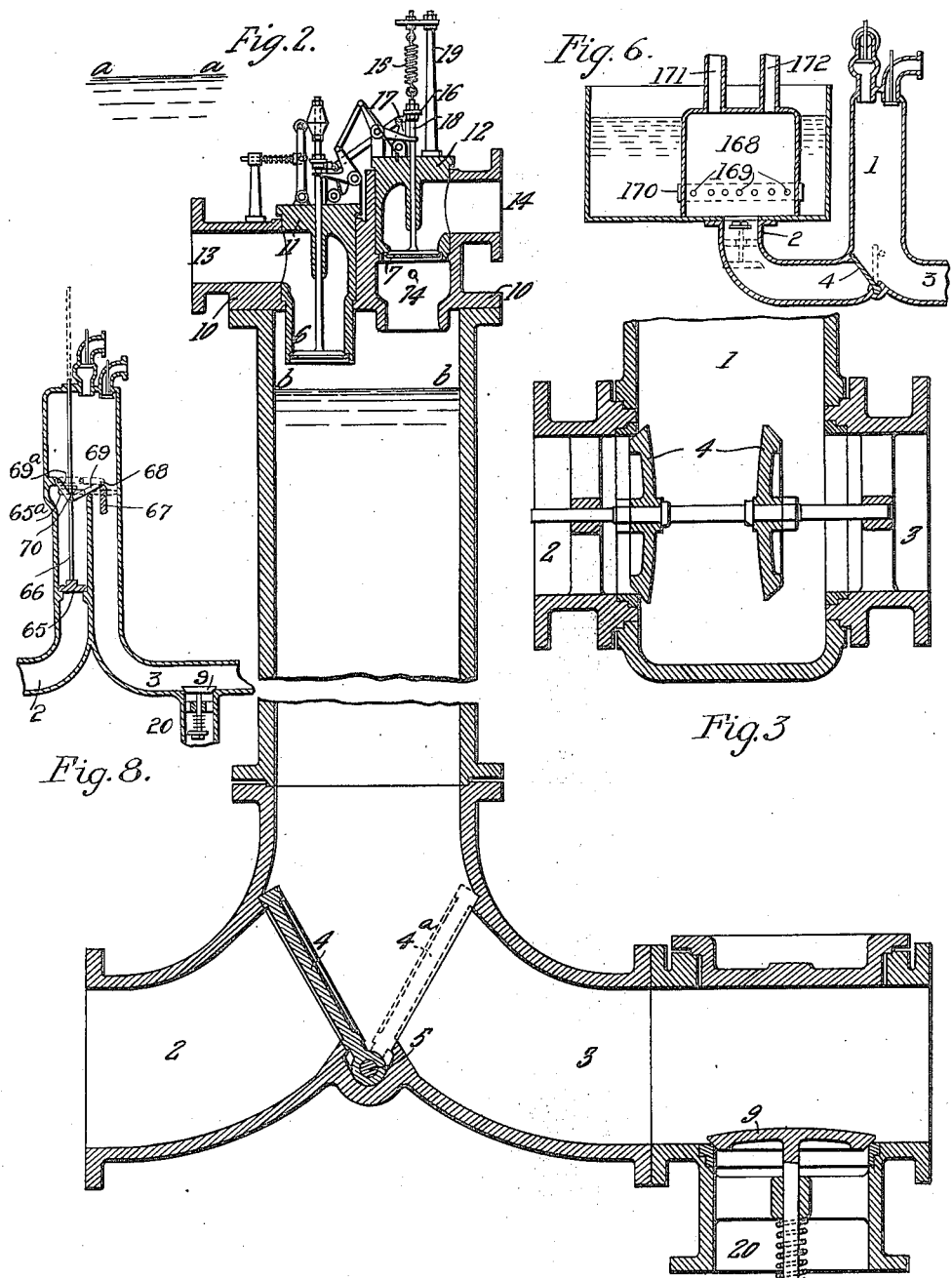

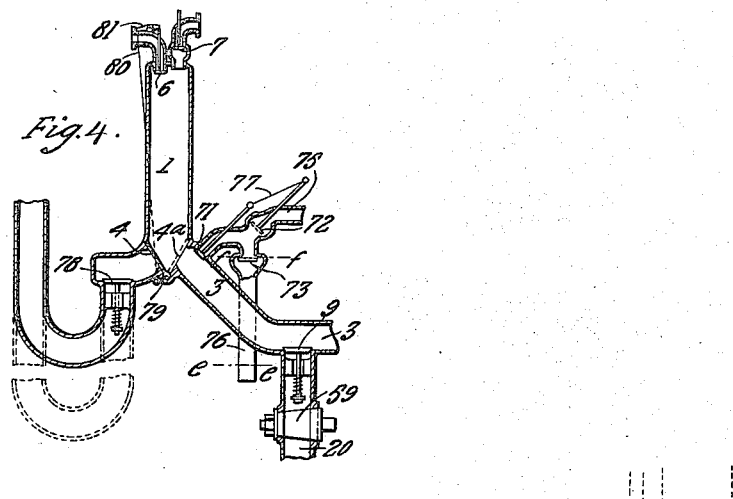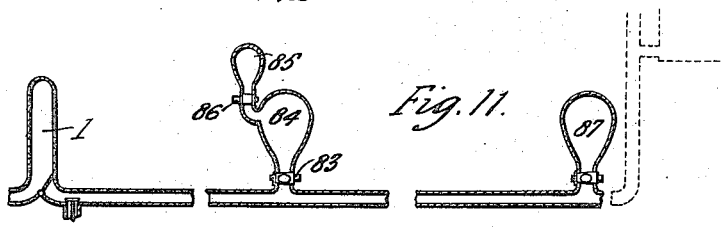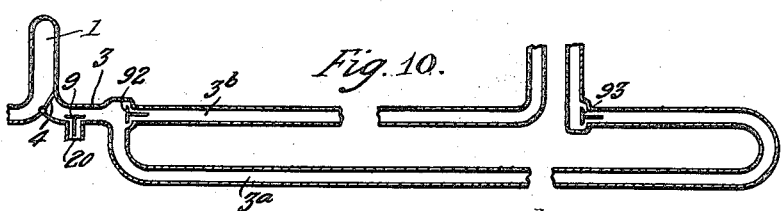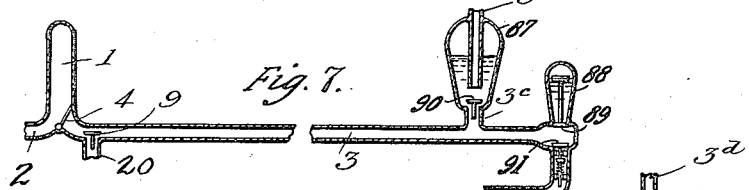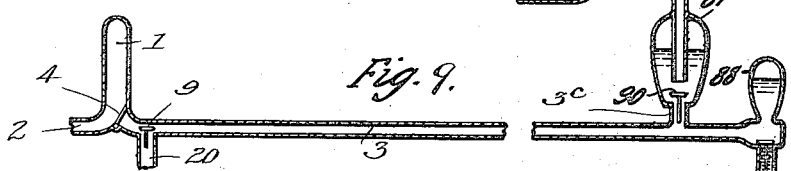

UNITED STATES PATENT OFFICE.

HERBERT ALFRED HUMPHREY, OF WESTMINSTER, LONDON, ENGLAND, ASSIGNOR TO HUMPHREY GAS PUMP COMPANY, A CORPORATION OF NEW YORK.

UTILIZING AN EXPANSIVE FORCE.

1,243,296.     Specification of Letters Patent.     Patented Oct. 16, 1917.

Application filed June 13, 1908, Serial No. 438,425. Renewed February 17, 1917. Serial No. 149,379.

*To all whom it may concern:*

Be it known that I, HERBERT ALFRED HUMPHREY, a subject of the King of Great Britain, residing at 38 Victoria street, Westminster, in the county of London, England, consulting engineer, have invented certain new and useful Improvements in Utilizing an Expansive Force, of which the following is a specification.

My invention relates to improvements in the art or method of utilizing an expansive force, such for example as the expansive force of an ignited combustible charge under pressure, or other elastic prime medium having high initial pressure and subsequent expansive force. My object is to provide an improved method whereby this expansive force is utilized in causing the reciprocation of a body of liquid, the movement in one direction of said reciprocation being due to said expansive force. My improved method comprises the utilization of the momentum of the liquid body in both directions of its reciprocation, whereby liquid can be delivered to a greater head, energy stored, fresh liquid entrained, burnt products expelled, and a fresh expansible charge entrained and compressed.

The invention is especially applicable to pumps and compressors.

The accompanying drawings illustrate, merely by way of example, apparatus whereby the invention herein described may be effected.

Figure 1 is a vertical section of a portion of my device showing the combustion and expansion chamber and valves connected therewith, a branch adapted to connect with a source of supply and another branch adapted to connect with a play pipe leading to a reservoir or other means for storing energy, not shown.

Fig. 2 is a similar view showing a modified form of valve control.

Fig. 3 is a cross-section showing a modified form of water-valve.

Figs. 4 to 11 are diagrammatic views in vertical section, showing various modifications of apparatus suitable for effecting the methods comprising my invention.

Fig. 1ª is a vertical sectional view on an enlarged scale, of the valve controlling mechanism shown in Fig. 1, and Fig. 2ª is a similar view, of the valve controlling mechanism shown in Fig. 2.

Similar numerals refer to similar parts throughout the several views.

Referring to Fig. 1, it may be assumed that a compressed combustible charge is contained in the upper part of chamber 1 and supports the column of liquid which extends from the play or discharge pipe 3 into said chamber 1. The said charge is ignited by any suitable means such as a sparking plug 74. Upon ignition the combustible charge expands against the liquid column driving the same downwardly out of chamber 1 and along the discharge or play pipe 3. The liquid column thus forced along the play pipe acquires momentum. It will be understood that the length and dimensions of the discharge or play pipe 3 must be such that the moving mass of liquid will acquire the momentum necessary for the effects to be produced.

Owing to this momentum the column continues its motion after the pressure in the combustion chamber 1 has fallen to or below that of atmosphere. This results in the inflow, through a suitable inlet valve, as for example the spring controlled valve 9, of a fresh supply of liquid which fills up behind the original column in the play pipe 3.

As soon as the pressure in combustion chamber 1 falls to or below atmosphere, the pressure in the supply pipe 2 is sufficient to throw valve 4 over into the position indicated by 4ª, opening communication between the supply and the combustion chamber 1, and closing communication between combustion chamber 1 and discharge pipe 3.

An exhaust valve 6 is connected with the combustion chamber and so controlled as to open as soon as the pressure in chamber 1 falls to or below atmosphere.

With the valve 4 in the position 4ª, the liquid from the supply will flow into chamber 1, and, assuming that the normal level of the supply is as indicated by *a a*, the liquid flowing from the supply into chamber 1, will acquire a momentum which will carry the level in chamber 1 considerably above that indicated by *a a*, that is, nearly or quite to valve 6, which up to this moment has been maintained open by means hereinafter to be described. This upward movement of the liquid in chamber 1 expels the products of combustion through valve 6. Valve 6 now closes, the liquid having risen in chamber 1 above its normal level *a a*, due to the momentum acquired, now falls in chamber 1, thereby drawing in a fresh combustible charge through valve 7, which valve then also closes.

The control and actuation of valves 6 and 7 will be described in detail later on.

When the momentum of the outflowing column of liquid in the discharge or play pipe 3 is exhausted, the column moves back or inwardly toward the combustion chamber, under the head or pressure to which it has been moved in the direction of its first impulse or outstroke, the valve 9 closing automatically. The return movement of the column of liquid in the play pipe 3, throws the valve 4 back to its original position, indicated in solid lines. In its return movement the column also acquires a momentum. This momentum, combined with the head or pressure, is utilized to compress the fresh combustible charge in chamber 1. This fresh charge at the moment of its maximum compression is ignited by an electric spark, and a new cycle begun.

It will thus be seen that with the expansion of each ignited charge, liquid is forced to a greater head or pressure, or energy is otherwise stored as will hereinafter be described.

It will be understood that when the liquid is forced along the discharge or play pipe 3, during its first outstroke, and valve 4 is thrown into the position indicated by the dotted lines 4ª, a diminution of pressure will be created behind the column flowing away from the valve 4, which will cause a suction of liquid through pipe 20 past valve 9, which is normally held on its seat by a light spring.

We thus have, broadly speaking, by the method above described, the ignition and expansion of a compressed combustible charge against a liquid column of suitable dimensions and path of travel. The expansion of this combustible charge against the liquid column drives the same out of chamber 1 and along play pipe 3 causing the first outstroke. During the movement of the outstroke the column acquires momentum, which carries it to a greater head or pressure than would otherwise be possible, and permits the combustible charge to expand to atmosphere. This also results in fresh liquid being drawn into the path of travel of the outwardly moving column. Liquid flowing into the combustion chamber expels the products of combustion and then descending therein entrains a fresh combustible charge. When the momentum of the outmoving column is exhausted, the column returns, again acquiring momentum on the instroke, to compress the fresh combustible charge in chamber 1.

*The liquid valve.*

In Fig. 1, I show the water valve 4 pivoted at 5 and having two seats with which it is adapted to coöperate. In one position it closes communication between chamber 1 and supply pipe 2, in the other position it closes communication between chamber 1 and discharge or play pipe 3.

In Fig. 3, I show a modified form of liquid valve which instead of being hinged as shown in Figs. 1 and 2, consists of two ordinary non-return or mushroom valves mounted rigidly on a slide rod and controlled in any suitable way, one to control the communication with the supply pipe and the other to control the communication with the discharge pipe. The operation and control of this form of valve will be substantially the same as that of the form of valve 4, shown in Fig. 1.

*Valve control.*

In Fig. 1, I have shown valve 4 provided with an arm 37 having its outer end connected with a piston rod secured to piston 38 movable in the cylinder 39. Cylinder 39 is adapted to be filled with oil and serve as a dash-pot to check the movement of said piston 38. By suitable grooves and by-passes and valves in the dash-pot cylinder 39 it will be obvious that the valve 4 may be controlled in any desired manner; to pause before coming against either seat, or to pause midway between the two seats for the purpose hereinafter to be described, and also the length of time required for its movement from one seat to another may be equally controlled to secure the required periodicity of cycle.

*Fuel supply valve and burnt product discharge valve, control and actuation.*

The actuation and control of the valves 6 and 7 as shown in Fig. 1 are as follows: Valve 6 is the exhaust valve for burnt products, and is normally held closed by the spring 35. Valve 8 is a spring controlled non-return valve for preventing the suction of burnt products backward through pipe 13. Valve 7 is the fuel supply valve, and is normally held closed by the spring 15, which is so light however as to permit the opening of valve 7 by suction caused by lowering the level of the liquid in chamber 1, after valve 6 is closed. Pipe 14 controlled by valve 7, is adapted to be connected with any suitable source of fuel supply, not shown. This fuel for example, may be a combustible gas or a mixture of combustible gas and air.

Rigidly connected with the valve 4 is the arm 21, to the free end of which is secured the rod 22. The other end of this rod 22 extends through a sleeve 25, see Fig. 1, pivoted to an arm 26 of a short rocking shaft 27, mounted on a suitable stationary support. Rod 22 is also provided with the tappets 23 and 24. When the valve 4 swings over into the position 4ª, the rod 22 is depressed and tappet 23 engages and depresses lever 26, causing a similar actuation of lever 28 which is also keyed to shaft 27. Lever 28 normally rests on pawl 34, which is pivoted to the stem of exhaust valve 6 and normally in line therewith. The depression therefore of lever 28 causes the depression of the stem of valve 6 and the opening of said valve. By the depression of rod 22 tappet 24 also engages and depresses the outer end of arm 29 connected with the rocking shaft 29ª. To rocking shaft 29ª is secured the pawl 17, and by the depression of arm 29 the spring controlled pawl 17 is disengaged from the collar 16 on the stem of fuel supply valve 7. Valve 7 is still held closed by the tension of spring 15, but is adapted to be opened upon the occurrence of suction in chamber 1, sufficient to overcome said spring tension. With the valve 4 in the position 4ª, valve 6 is held open, and the liquid rising in chamber 1, expels the products of combustion past valves 6 and 8, through pipe 13. The return stroke of the liquid in chamber 1 due to its having traveled above its normal level or head, causes a suction sufficient to cause the opening of valve 7 and to entrain fresh combustible charge through pipe 14. Upon the downward movement of valve 7, due to this suction, the pin 18, which is secured to the stem of said valve 7, engages in the fork arm 30 of bell-crank 31 which is pivotally mounted at 32. Bell-crank 31 is connected, by a link 33, with pawl 34. The depression of arm 30 of bell-crank 31 causes the movement of pawl 34 against the tension of spring 36, out of engagement with lever 28, so that spring 35 may close valve 6. When the force of suction no longer exceeds that of spring 15, valve 7 is closed again, and in rising the pin 18 returns crank 31 to its original position pressing pawl 34 against the end of lever 28, ready to be pulled beneath this end, by the spring 36, as soon as valve 4 has lifted rod 22 by returning to its original position. Pawls 17 and 34 will then be returned to their original positions by their respective springs.

*Valve control and actuation modified.*

When the level of the liquid supply is above the top of the combustion chamber as indicated by Fig. 5, or when the head or pressure of said liquid supply is such that the liquid, flowing into the combustion chamber to expel the products of combustion, would tend to overflow the level of the exhaust valve, the oscillations of the liquid for securing the intake of fresh charges may be secured in a slightly different manner from that described above.

In Fig. 5, for example, the supply tank 58 is shown at a higher level than the top of chamber 1, $a\ a$ indicating the level of the liquid in said tank. Assuming that a compressed charge exists above the level $b\ b$ in the combustion chamber, and the charge ignited, the charge expands against the column of liquid in chamber 1 and play pipe 3, and causes the outflow of liquid from the combustion chamber along the discharge pipe, which also results in the swinging of valve 4 over into the position 4ª. The exhaust valve 6 as shown in Figs. 2 and 2ª, now opens by its own weight, due to the diminution of pressure in chamber 1.

Liquid flowing from the supply tank rises in the combustion chamber and expels the products of combustion, but as the level of the liquid in the supply tank is such that the liquid in the supply chamber tends to rise above the level in the valve 6, this valve will be forced upon its seat by the impact of the rising liquid upon said valve.

The further motion of the liquid is arrested by the cushioning of the exhaust products entrapped in the top of the combustion chamber above the level of the valve 6. This cushioning puts the entrapped products under pressure to an extent depending principally upon the momentum of the flow of the liquid into chamber 1 at the time of the seating of valve 6. When the liquid comes to rest against the elastic cushion, the elastic cushion expands driving down the liquid in the combustion chamber, the momentum acquired in its downward movement causing the level of the liquid to pass below the valve 6. That is to say, the momentum of the liquid column, in its downward movement, causes it to move below the level necessary to permit the imprisoned products to expand to atmosphere, and this causes the entraining of a fresh combustible charge past inlet valve 7. The level of the liquid having reached its lowest point some compression of the fresh charge may occur, due to the further tendency of the liquid between the supply tank and the combustion chamber to oscillate. The final compression however of the combustible charge is produced by the inward flow of the column of liquid in the play pipe as already described.

An example of means for actuation and control of the burnt product valve and fuel supply valve, under conditons last above indicated, is illustrated in Figs. 2 and 2ª.

The exhaust valve 6 is normally locked in the closed position by a pawl 40 engaging under a collar 41 on the valve-stem. The stem of valve 6 is also provided with the member 43 tapering in both directions from near its middle portion. A lever 45 is pivoted at 46 to a stationary lug and is controlled by the spring 44. At the free end of lever 45 is mounted the roller 42 adapted to engage with the tapering surfaces of member 43. In the position of the parts shown in Fig. 2ª the roller 42 is so engaged with member 43 as normally to maintain the valve 6 on its seat, even after pawl 40 disengages from shoulder 41. The weight of valve 6 may be so adjusted with respect to the pressure exerted by roller 42, due to spring 44, that the valve will remain seated until the pressure in chamber 1 falls below atmosphere. This occurs at the end of the expansion stroke, at which time as will be presently seen, pawl 40 is clear of roller 41. The valve 6 will now open, the roller 42 yielding sufficiently to permit the member 43 to descend. At the same time pin 47, on the stem of valve 6, will engage crank 48 to actuate, through link 49, crank 50, bringing the arm 51 of crank 50 into engagement with pin 52 on the stem of valve 7. This position of arm 51 in engagement with pin 52 is maintained stable by the over-the-center action of spring 53. This movement of crank 48 also puts tension on spring 55 and relieves the tension on spring 56, both of which are connected with the link 57 which is connected with the pawls 17 and 40. The effect of this is that pawl 40 and pawl 17 are both urged toward the left, but are prevented from moving in that direction by collar 41, until the exhaust valve is again raised to permit pawl 40 to engage under said collar 41 thus locking the exhaust valve upon its seat and releasing the inlet valve 7.

After the exhaust valve has opened it remains open until shut by the impact of the liquid upon it as already described. Thus, after the cushioning stroke has occurred the inlet valve 7 is free to open and admit a fresh combustible charge, after which this valve closes again by the action of spring 15. Upon the opening of inlet valve 7, pin 52 engages the end of arm 51 and returns the arm to the first position where it is then held by spring 53. Tension is thereby put on spring 56 so that when valve 7 is again seated, pawl 17 engages under collar 16 and pawl 40 is moved clear of collar 41 of exhaust valve 6.

Where the exhaust valve and the inlet valve open in response to diminution of pressure in the combustion chamber, and where these valves are required to move locking and releasing mechanisms, requiring the expenditure of a small amount of power, the valves themselves are preferably provided with prolonged valve openings and to act as pistons in such prolongations of their valve openings as shown in Fig. 2ª.

The apparatus for effecting my method or methods may be varied in a number of ways, as for example, by altering the arrangement of the connections between the combustion chamber and the liquid supply and the delivery pipes respectively, or by the arrangement of auxiliary suction pipe or pipes.

*Measuring the combustible charge.*

It is sometimes preferable to insure that the combustible charge taken in shall be a definite one, so as to give more perfect control in keeping the energy of successive cycles approximately constant. In such case the apparatus may be provided with a measuring device introduced either into the supply pipe or into the discharge pipe. Fig. 8 illustrates one of several forms which such a device may take. In the supply pipe 2 is a piston valve 65 attached to a rod 66 and capable of moving, under the action of the liquid flowing in pipe 2, toward the combustion chamber, into the dotted position 65ª. In this position liquid can flow past the piston 65 into the combustion chamber to expel the burnt products. As soon however as this liquid begins to return toward the supply tank and draw in a fresh combustible charge, the piston 65 enters into the cylindrical portion of the supply pipe, in which it forms a freely moving piston. By the limited motion of this piston 65 in passing from its uppermost position 65ª, to its lowermost position, it measures into the combustion chamber an approximately definite quantity of combustible charge. I have also provided in the discharge pipe a throttle valve, as indicated at 67, actuated by the arm 68, attached by link 69 to an arm 69ª, pivoted to a projection on the wall of the combustion chamber.

When expansion occurs the throttle valve is open and the piston valve is on its seat closing the connection with the supply pipe. When expansion has proceeded to the point at which the pressure below the piston valve exceeds that above it the valve rises and engages the arm 69ª causing the closure of the throttle valve 67. The throttle valve remains closed and so prevents any liquid returning along the discharge pipe into the combustion chamber until the piston valve, returning to its seat, causes a tappet 70 on the piston rod to engage arm 69ª and so open the throttle valve 67. The liquid column in the discharge pipe is now free to return and compress the fresh combustible charge.

*Modification in method of introducing combustible charge.*

It is not essential that the whole of the fresh charge, or the constituent parts thereof, should be drawn in at the top of the combustion chamber. When desirable, the inlet valve 7 may be either superseded or supplemented by another valve situated in the delivery pipe, as shown at 71 in Fig. 4. One constituent part of the combustible charge will be admitted by valve 7, and another part by valve 71. When valve 4 swings into the position 4ª, as already described, the liquid in pipe 3 is moving with considerable velocity and causes a diminution of pressure to the rear of the column which results in drawing in a constituent part of the combustible charge through valve 71. The degree of suction produced in that part of the pipe adjacent valve 71 depends, among other things, upon the degree of freedom with which liquid can be drawn through the auxiliary suction pipe 20 past valve 9. Consequently the degree of suction at valve 71 may be adjusted by more or less closing the cock 59 in pipe 20. In order to have a definite amount of combustible mixture, or of a constituent part thereof introduced through valve 71, at each cycle, there may be an attachment shown in Fig. 4, which consists mainly of two valves 72 and 73 controlling respectively a pipe 75, which is adapted to admit a constituent part of the combustible mixture, and a pipe 76 dipping into a supply of liquid at the level, as for example that indicated by $e\ e$.

The operation with respect to this part of the apparatus is as follows:

When valve 4 comes into position 4ª, valve 71 opens and a constituent part of the charge is drawn into pipe 3. Valve 71 however is connected with valve 72 by the link 77, so that when valve 71 opens valve 72 is closed. The suction draws liquid up pipe 76 from level $e\ e$ to level $f\ f$, thus displacing the indrawn charge by liquid until the liquid shuts valve 73. As the volume of liquid between the two levels is a definite amount, this arrangement allows a given volume of the constituent part of the charge to be drawn into the discharge pipe. When valve 71 closes and valve 72 is permitted to open, the liquid in 76 will seek its normal level $e\ e$ and thus entrain a definite fresh supply of combustible or ingredients thereof. It will be observed that by altering the level of the liquid into which the pipe 76 dips, the amount of combustible charge drawn in through pipe 75, past valve 72, when the valve 71 is shut, can be varied. The cycle of operations for the whole need not be repeated, but it should be stated that after the outwardly moving column of liquid in the discharge pipe has come to rest the constituent part of the charge which has been drawn into the sloping portion of the discharge pipe is swept by the inwardly moving column of liquid into the combustion chamber, and therein compressed. The other constituent part or the other portion of the combustible mixture may be drawn in in the usual manner through valve 7. A substantially similar control of the intake through valve 7, as has been described with respect to valve 71 may be employed if desired.

Another method of introducing fresh combustible charge may be employed by means of apparatus such as is illustrated in Fig. 6. Between the liquid in the supply tank 58 and the supply pipe 2 is placed a bell or other chamber 168. The bell is provided with a number of apertures 169, and a surrounding movable band 170 is correspondingly apertured. The bell 168 is provided at its upper part with one or more inlets as for example, 171 and 172, for the introduction of the constituent parts of the combustible charge. When the valve 4 is in the position closing communication between the combustion chamber and the supply, the liquid in the tank tends to level itself and rise to the same level in the bell. Toward the end of the expansion stroke, when valve 4 has taken the dotted position, liquid from the bell enters the combustion chamber to expel burnt products. If the exhaust valve is shut and the inlet valve is not permitted to open, or is permitted to open only under a sufficiently stiff spring, the liquid flowing in the discharge pipe will draw after it liquid from the supply pipe, in the manner already described in connection with Fig. 6. The band 170 is adjusted with respect to the amount of registration between its apertures and the corresponding apertures in the bell, so that the amount of openings in the bell is such that the total liquid flowing therethrough into the bell, will be less than the demand for liquid in the discharge pipe. From this it results that air or combustible or both will be drawn, through the pipes 171 and 172 which are connected with sources of supply, in the supply pipe and combustion chamber. When the liquid in the discharge pipe has come to rest, after its outstroke it reverses its direction of flow, causes valve 4 to close the supply pipe, and compresses the combustible charge in the combustion chamber. While valve 4 is closed, so much of the combustible charge as was in the supply pipe and lower portion of the bell, is replaced by liquid from the supply tank, flowing through the holes of the bell, and when the liquid level in the bell has risen sufficiently, conditions are suitable for starting a fresh cycle.

By means of a dash-pot.

The control of valve 4 may be secured by a dash-pot, so that liquid may flow over the top of valve 4 from the supply into the play pipe 3 during a desired portion of the outstroke. In addition to this, by similarly delaying the closure of the supply pipe 2 during a portion of the instroke or return of liquid column from the play pipe, some of this liquid will flow over the top of valve 4 into the supply pipe, thus allowing the velocity of the returning column to increase beyond that which it would otherwise attain with supply pipe closed by valve 4. The additional kinetic energy stored in the moving column will result in a greater compression pressure of the combustible charge. This method of increasing the compression applies in general and is not confined to this particular case.

In this, as in other cases, expansion may be continued beyond atmospheric pressure without loss of energy, because, if the exhaust and inlet valves are kept closed long enough, work will be done by the external atmosphere in forcing liquid into the combustion chamber until atmospheric pressure is again attained.

Air vessels.

If the working pressures may be regarded for the moment, as the same for each cycle, then the periodicity of the cycle depends upon the length and mass of the columns of liquid which are acted upon by the said pressures, or in other words, by the dimensions of the pipes in which these columns move.

It would be inconvenient to alter the dimensions of the pipes for the purpose of varying the periodicity of the cycle. The desired effect may be obtained by the use of air vessels communicating with said pipes. It will be sufficient to explain the effect of introducing air vessels into the discharge pipe, as shown in Fig. 11. These air vessels may be controlled by cocks, and when these cocks are shut then the full length of the discharge pipe is effective as regards resulting periodicity.

If for example, cock 83 on air vessel 84 is opened, liquid forced from the combustion chamber, during the working stroke, causes liquid from the discharge pipe to enter the air vessel, but on the return stroke, when the liquid flows back toward the combustion chamber to compress the combustible charge, liquid leaves the air vessel again. The result is to make the effective length of the discharge pipe shorter. If the air vessel 84 might be considered indefinitely large, the effective length of the discharge pipe may be considered as that between the combustion chamber and the air vessel, and the flow of liquid in the discharge pipe beyond the air vessel would become nearly continuous. The effect of the air vessel depends upon its capacity and as it would involve a loss of energy to throttle the liquid inlet by means of the cock 83 it is better to add an additional air vessel 85, the communication with which can be controlled by the cock 86. It will be noted that when air vessels are used in the manner described, they serve as accumulators, as means whereby energy is stored, in the elastic cushions contained in said air vessels, during the working stroke, and whereby energy is imparted at the beginning or during the compression stroke.

Another modification is illustrated in Fig. 7, in which the air vessel or accumulator 87 is connected by connection $3^c$ with the conduit or play pipe 3. The accumulator 87 is also connected with the discharge pipe $3^d$, with the object of producing a continuous flow. This air vessel may be fitted with a non-return valve 90, in which case a second air vessel or accumulator 88 may be used to store energy for causing the return flow of the mass of liquid to compress the combustible charge. The liquid inlet is shown at 20 connected with the play pipe or conduit 3 at pump chamber 1, at a point remote from the discharge valve 90. Inlet 20 is controlled by the non return valve 9.

Vessel 88 is preferably provided with a valve 89 attached to a float so that when the liquid is risen to a given height the float closes the valve. This secures a uniform compression of the elastic cushion in chamber 88.

In operation, when the column of liquid flows outwardly from the pump chamber or combustion chamber 1 along conduit or play pipe 3, liquid enters first into air vessel 88 until the level of the liquid therein attains a height at which the float closes the valve. This should be so adjusted that the available energy then stored in the elastic cushion reaches that required for starting the return or compression stroke. When valve 89 closes, the column of liquid in the discharge has a considerable velocity, and as its motion cannot be instantly arrested by the closing of the valve 89, the flow continues and the valve 90 on the air vessel 87 is forced open and liquid flows into the air chamber 87 and the discharge pipe connected therewith until the energy of motion is expended. This arrangement of air vessels is preferable in the case where the liquid is used, for example, to drive a Pelton-wheel, because it is desirable to use a higher pressure in that case than is required for other impulse or reaction turbines, and the arrangement permits of much higher head or pressure being attained, as the pressure in air vessel 87 may exceed any of the working pressures in the combustion chamber.

In the case where even higher liquid pressures are required, in order to obtain complete expansion of the products in the combustion chamber, there may be another valve 91 at the end of the discharge pipe, which is normally kept open by a spring, but which is adapted to be closed against such spring tension when the liquid flowing past the valve reaches a given velocity, on the principle of the well-known hydraulic-ram. In such case the liquid flowing in the discharge pipe first runs to waste through valve 91, while the velocity of flow in the discharge pipe is increasing, until the valve 91 is closed.

Fig. 9 shows a similar arrangement to that last described, but without any valve or float in the air vessel 88. Consequently the elastic cushion pressure in the air vessel 88 must become equal to the pressure in the air vessel 87 before the valve 90 opens, and in this case, owing to the higher pressure, the quantity of elastic fluid in air vessel 88, required to store the energy for compressing the combustible charge will be less than if a larger volume of elastic fluid is used and the pressure kept lower, as in the arrangement of Fig. 7.

As already stated, the delivery and suction pipes may be duplicated and so arranged that the forces developed tend to balance each other.

A duplication of the discharge pipe may also serve to make the apparatus operate more quickly. Thus, the discharge pipe 3 may branch into two pipes 3$^a$ and 3$^b$. If each of these pipes is of the same length and diameter as the one discharge pipe which they replace, the time of the cycle will be shortened. If the branch 3$^a$ is longer than the branch 3$^b$, and non-return valves 92 and 93 are introduced as shown, so that the branch 3$^a$ becomes the passage for the outwardly flowing liquid and 3$^b$ the passage for the return flow, then a more continuous flow can be obtained in the branch 3$^a$, and such an arrangement is shown in Fig. 15.

Starting.

For starting the apparatus, the combustible charge may be pumped by hand into the combustion chamber 1, through any suitable inlet for example, valve 7, against the static head or pressure of the liquid in the combustion chamber and discharge pipe. By ignition of the charge thus introduced the cycle is started.

Provision for mis-fire.

It is possible that, in starting the operations above described, the correct proportions between the constituents of the combustible mixture may not be readily obtained and the charge may fail to ignite. Changes in the composition of the combustible mixture may also occur during operations with like result. In order to assure a continuance of working in spite of a misfire, the liquid inlet valve may normally be held off its seat in such manner that during the return or compression stroke liquid is allowed to flow to waste through said valve until the valve is closed under the action of the velocity of said flow. The column thus gains a higher velocity than if it only returned to compress the charge, and if the charge is not ignited it will, after compression to a higher pressure than usual, expand again much as if there had been a feeble explosion. Valve 4 will change to the position shown in dotted lines, and the unburnt charge will be exhausted and a new charge drawn in, in the usual manner, the cycle being repeated at the expense of the energy of the high level or pressure reservoir, which supplies the liquid for the returning column.

This result may be obtained by so regulating the dash-pot on valve 4, that when it is returning from the position 4$^a$, to the position shown in full lines, it is arrested in the position which allows the discharge and supply pipe to remain in communication long enough for some of the liquid which flows inwardly toward the combustion chamber to pass over the top of valve 4 into the supply pipe. In this way an increased velocity is secured in the return or compression stroke, whereby the fresh charge is compressed under such conditions that it expands again to a pressure low enough to bring about the movement of valve 4, and of the exhaust valve, as in the ordinary working cycle, so that the unburnt charge is swept out and a new charge introduced.

It will be understood that air vessels may be used wherever necessary in connection with my method, for preventing shocks or increasing or modifying the efficiency of the several steps of the operation as described, and it will also be understood that the words "head" and "pressure" are considered to be substantial equivalents.

What I claim is:—

1. The method which consists in reciprocating a body of liquid of sufficient bulk and path of travel to acquire useful momentum, one movement of said reciprocation caused by the energy of a medium having high initial pressure and expansive force and restraining the expansive force after the liquid has been set in motion.

2. The method which consists in reciprocating a body of liquid of sufficient bulk and path of travel to acquire useful momentum, one movement of said reciprocation caused by the energy of a medium having high initial pressure and expansive force, restraining the expansive force after the liquid has been set in motion, and utilizing the momentum of the liquid after the influence of the expansive force has been restrained to cause a diminution of pressure to entrain fresh liquid.

3. The method which consists in reciprocating a body of liquid of sufficient bulk and path of travel to acquire useful momentum, one movement of said reciprocation caused by the energy of a medium having high initial pressure and expansive force and utilizing an elastic cushion as an accumulator for absorbing and imparting energy in connection with said reciprocations of the liquid.

4. The method which consists in reciprocating a body of liquid of sufficient bulk and path of travel to acquire useful momentum, one movement of said reciprocation caused by the energy of a medium having high initial pressure and expansive force and utilizing elastic cushions as both high pressure and low pressure accumulators for absorbing and imparting energy in connection with said reciprocations of the liquid.

5. The method which consists in reciprocating a body of liquid of sufficient bulk and path of travel to acquire useful momentum, one movement of said reciprocation caused by the energy of a medium having high initial pressure and expansive force and utilizing the movements of the liquid for introducing measured charges of the expansible medium to act upon the liquid at required intervals.

6. The method which consists in reciprocating a body of liquid of sufficient bulk and path of travel to acquire useful momentum, one movement of said reciprocation caused by the energy of a medium having high initial pressure and expansive force, utilizing the movements of the liquid for introducing measured charges of the expansible medium to act upon the liquid at required intervals, and adjusting the amount of the said measured charges to meet required conditions.

7. The method which consists in reciprocating a body of liquid of sufficient bulk and path of travel to acquire useful momentum, one movement of said reciprocation caused by the energy of a medium having high initial pressure and expansive force, restraining the expansive force after the liquid has been set in motion, and utilizing the momentum of the liquid to compress the expansible medium.

8. The hereinbefore described method of pumping liquids by means of the energy of a medium having high initial pressure and expansive force; which consists in causing said medium to impart pressure and movement to a body of liquid, a portion of which is interposed between a pump chamber and a relatively low pressure accumulator and a portion of which is interposed between an inlet for liquid and a region of relatively high pressure discharge, the respective portions of said liquid being of such dimensions as substantially to retard the expansion of said medium; transmitting pressure and energy by means of said body of liquid to said regions of high and low pressure; discharging a portion of the liquid interposed between said inlet and said region of high pressure discharge; cutting off communication with said region of high pressure discharge and permitting the actuating pressure to act upon the portion of liquid interposed between the pump chamber and said accumulator during the expansion of the prime medium; whereby a portion of the relatively high pressure energy of said medium is utilized to pump against relatively high pressure and the balance of available energy of said medium is utilized to perform work against relatively low pressure.

9. The hereinbefore described method of pumping liquids by means of the energy of a medium having high initial pressure and expansive force, which consists in causing said medium to impart pressure and movement to a body of liquid, a portion of which is interposed between a pump chamber and a relatively low pressure accumulator, and a portion of which is interposed between an inlet for liquid and a region of relatively high pressure discharge; the respective portions of said liquid being of such dimensions as substantially to retard the expansion of said medium; transmitting pressure and energy by means of said body of liquid to said regions of high and low pressure; discharging a portion of the liquid interposed between said inlet and said region of high pressure discharge; cutting off communication with said region of high pressure discharge; permitting the actuating pressure to act upon the portion of liquid interposed between the pump chamber and said accumulator during the expansion of the prime medium; causing the continued movement of the liquid to create a region of low pressure at said inlet; admitting a new increment of liquid through said inlet into said region of low pressure; cutting off communication between said inlet and the source of supply of liquid to be pumped and in causing the accumulator to react upon that portion of liquid interposed between said pump chamber and said accumulator to effect the return stroke thereof in preparation for the next out stroke thereof.

10. The hereinbefore described method of pumping liquids by means of the energy of a medium having high initial pressure and expansive force, which consists in causing said medium to impart pressure and movement to a body of liquid, a portion of which is interposed between a pump chamber and a relatively low pressure accumulator and a portion of which is interposed between an inlet for liquid and a region of relatively high pressure discharge; the respective portions of said liquid being of such dimensions as substantially to retard the expansion of said medium; transmitting pressure and energy by means of said body of liquid to said regions of high and low pressure; discharging a portion of the liquid interposed between said inlet and said region of high pressure discharge; cutting off communication with said region of high pressure discharge; permitting the actuating pressure to act upon the portion of liquid interposed between the pump chamber and said accumulator during the expansion of the prime medium; causing the continued movement of the liquid to create a region of low pressure at said inlet; admitting a new increment of liquid through said inlet into said region of low pressure; cutting off communication between said inlet and the source of supply of liquid to be pumped and in causing the accumulator to react upon that portion of liquid interposed between said pump chamber and said accumulator to effect the return stroke thereof and to compress the prime medium in preparation for the next out stroke thereof.

In testimony whereof I have signed my name to this specification in the presence of two subscribing witnesses.

HERBERT ALFRED HUMPHREY.

Witnesses:
 JOSEPH KILLARD,
 W. J. SKERTEN.